(12) United States Patent
Park et al.

(10) Patent No.: US 7,759,580 B2
(45) Date of Patent: Jul. 20, 2010

(54) HALOGEN-FREE FLAME RETARDANT COMPOSITION FOR CABLE COVERING MATERIAL AND CABLE FOR RAILWAY VEHICLES USING THE SAME

(75) Inventors: Do-Hyun Park, Anyang-si (KR); Il-Gun Seo, Anyang-si (KR)

(73) Assignee: LS Cable Ltd. (KR)

( * ) Notice: Subject to any disclaimer, the term of this patent is extended or adjusted under 35 U.S.C. 154(b) by 96 days.

(21) Appl. No.: 11/916,736

(22) PCT Filed: Jun. 17, 2005

(86) PCT No.: PCT/KR2005/001888

§ 371 (c)(1),
(2), (4) Date: May 13, 2008

(87) PCT Pub. No.: WO2006/132452

PCT Pub. Date: Dec. 14, 2006

(65) Prior Publication Data

US 2009/0020311 A1  Jan. 22, 2009

(30) Foreign Application Priority Data

Jun. 8, 2005  (KR) .................... 10-2005-0049054

(51) Int. Cl.
*H01B 3/00* (2006.01)
(52) U.S. Cl. ................................. 174/121 A
(58) Field of Classification Search ............ 174/120 R, 174/121 A, 110 SR
See application file for complete search history.

(56) References Cited

U.S. PATENT DOCUMENTS

2002/0096356 A1 * 7/2002 Kim et al. ............... 174/137 A

FOREIGN PATENT DOCUMENTS

| EP | 0 530 940 A1 | 3/1993 |
| GB | 1 575 483 | 9/1980 |
| JP | 7-207126 A | 8/1995 |
| JP | 9-95630 A | 4/1997 |

OTHER PUBLICATIONS

International Search Report, dated Jan. 10, 2006, issued in International Application No. PCT/KR2005/001888.

* cited by examiner

*Primary Examiner*—Chau N Nguyen
(74) *Attorney, Agent, or Firm*—NSIP Law

(57) ABSTRACT

Disclosed are a composition for a cable-covering material used in railway vehicles, and a cable for railway vehicles using the same. The present invention provides the halogen-free flame retardant composition including 100 parts by weight of a base resin including ethylene-vinylacetate copolymers; 60 to 250 parts by weight of mixed metal hydroxide as a halogen-free flame; 1 to 30 parts by weight of a flame-retardance auxiliary; 0.5 to 5 parts by weight of a silane-based coupling agent; 0.5 to 8 parts by weight of a cross-linking formulation; and 3 to 15 parts by weight of a cross-linking agent. The composition according to the present invention may be used in the cable-covering material for railway vehicles under the extreme conditions because it has excellent properties such as resistance against dynamic pressure at high temperature and durability, as well as low smoke and flame retardance upon its combustion.

16 Claims, 1 Drawing Sheet

HALOGEN-FREE FLAME RETARDANT COMPOSITION FOR CABLE COVERING MATERIAL AND CABLE FOR RAILWAY VEHICLES USING THE SAME

CROSS-REFERENCE TO RELATED APPLICATIONS

This application is a is a national stage application under 35 U.S.C. 371 based on and claiming the benefit of International Application Serial No. PCT/KR2005/001888 filed on Jun. 17, 2005 which claims the benefit of priority from Korean Application No. 10-2005-49054 filed on Jun. 8, 2005, the entire contents of each of which is incorporated herein by reference.

TECHNICAL FIELD

The present invention relates to a composition for a cable-covering material used in railway vehicles, and a cable for railway vehicles using the same.

BACKGROUND ART

Cable for railway vehicles has to show excellent properties such as thermal resistance and oil resistance and maintain the properties for a long time under various weather conditions such as high/low temperature and a sudden temperature change because it is used under extremely severe conditions, compared to general cables. Also, the vehicle should essentially have stability properties, for example flame retardance and low smoke, so as to secure safety of human life, cargo and equipment and to minimize losses if a fire breaks in the vehicles. A great interest has been increasingly taken in applications and roles of the cable for vehicles due to expanded construction of a high-speed railway and its increased use in recent years, therefore there is still required for a cable for vehicles showing more excellent properties.

Until now, a base resin including halogen, for example polyvinyl chloride, polychloroprene or polychlorinated polyethylene, was generally used as a covering material of the cable for railway vehicles. However, such a base resin including halogen has disadvantages of being difficult to obtain a flame-retardant covering material having less than 0.5% of halogen and less than 1.5 of toxicity index, and also of having a poor thermal property at high temperature.

To solve the above-mentioned problems, a large quantity of metal hydroxide might be used as a halogen-free flame retardant to obtain a cable satisfying standard levels on halogen content and flame retardance, as well as low smoke and low toxicity index. But, the cable has problems of having extremely deteriorated properties such as a mechanical property and properties after heating at high temperature due to such a large quantity of the flame retardant, and also having a deteriorated oil resistance against oils such gasoline or polar oils.

Meanwhile, a polar resin having high content of a polar group, a crystalline resin having a melting point higher than that in a test condition on an oil resistance, or an engineering plastic was used as a basic resin so as to satisfy the oil resistance in the prior art. However, the resin, which has a high melting temperature and a crystalline structure, and the polyester-based engineering plastic have problems of being difficult to install them in a narrow space and a complex structure, and showing a poor bending durability due to a very low flexibility for repeated movements and bendings even after their installations, because they show a remarkably high solidity and a greatly low flexibility at room temperature. In addition, it is not possible to use such a soft and flexible material in specific sections subjected to stress and pressure because the material is easily deformed due to its greatly low resistance against dynamic pressure at high/room temperatures if a rubber material with a polar group having an excellent resistance against specific oils is used for the purpose of improving the oil resistance.

As described above, a cable and a cable-covering material, which have stabilities upon the firing and also show properties suitable to the environment and a high durability upon its use, continue to be on demand in recent years.

DISCLOSURE OF INVENTION

Accordingly, the present invention is designed to solve the problems of the prior art, and therefore it is an object of the present invention to provide a composition for a cable-covering material used in railway vehicles, which has an excellent flexibility and an excellent resistance against dynamic pressure at high temperature, as well as an excellent durability against specific oil components such as saline, water and gasoline, and shows an excellent stability upon the firing by securing low smoke and flame retardance, as in minimizing emission of toxic gases if a fire breaks in the vehicle, and also to provide a cable for railway vehicles provided with a coating layer formed from the composition.

In order to accomplish the above object, the present invention provides a halogen-free flame retardant composition for a cable-covering material used to form a coating layer of cable for railway vehicles, comprising 100 parts by weight of a base resin including 50 to 80 parts by weight of an ethylene-vinylacetate copolymer having a vinylacetate content of 50 to 80% by weight, and 20 to 50 parts by weight of an ethylene-vinylacetate copolymer having a vinylacetate content of 28 to 49% by weight; 60 to 250 parts by weight of mixed metal hydroxide acting as a halogen-free flame retardant and composed of 30 to 100 parts by weight of untreated metal hydroxide and 30 to 150 parts by weight of metal hydroxide surface-treated with silane; 1 to 30 parts by weight of a flame-retardance auxiliary; 0.5 to 5 parts by weight of a silane-based coupling agent; 0.5 to 8 parts by weight of a cross-linking formulation; and 3 to 15 parts by weight of a cross-linking agent.

At this time, the base resin preferably has a vinylacetate content of 28 to 46% by weight, and further comprises 1 to 15 parts by weight of an ethylene-vinylacetate copolymer or an ethylene-vinylacetate-acid terpolymer grafted with a polar group. Here, the polar group is selected from the group consisting of a maleic anhydride, glycidyl methacrylate and acrylic acid, etc.

In the present invention, the metal hydroxide selected from the group consisting of aluminum hydroxide, magnesium hydroxide, calcium hydroxide, basic magnesium carbonate, hydrotalcite, huntite and hydromagnesite may be used alone or with a mixture thereof. Also, the mixed metal hydroxide is preferably a mixture of untreated aluminum hydroxide and magnesium hydroxide surface-treated with silane, or a mixture of untreated magnesium hydroxide and aluminum hydroxide surface-treated with silane.

In the present invention, the flame-retardance auxiliary selected from the group consisting of borate, boron compound, silicon-based compound, molybdenum-based compound and tin-based compound may be used alone or with a mixture thereof.

In addition, the composition according to the present invention preferably further includes 1 to 30 parts by weight of nanoclay.

Meanwhile, the present invention provides a cable for railway vehicles including a conducting part; a separating film surrounding the conducting part; an insulating layer surrounding the separating film; and a sheath layer surrounding the insulating layer, wherein at least one of the insulating layer and the sheath layer is formed from the composition for a covering material.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

Figure 1:
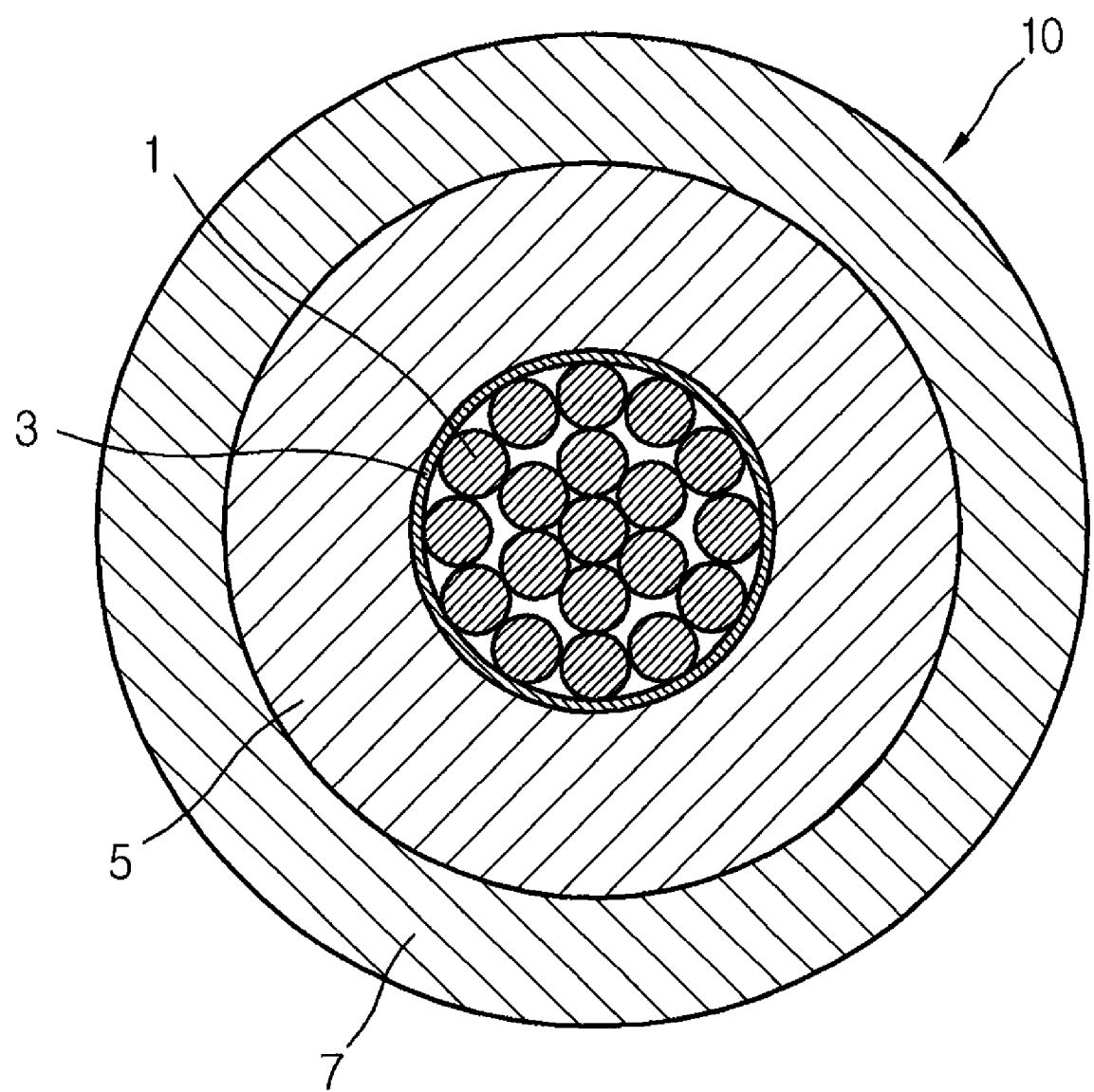
FIG. 1 is a cross sectional view showing a conventional cable for railway vehicles.

Hereinafter, preferred embodiments of the present invention will be described in detail.

The composition for a cable-covering material according to the present invention uses as a base resin a mixed resin including an ethylene-vinylacetate copolymer having a vinylacetate content of 50 to 80% by weight, and an ethylene-vinylacetate copolymer having a vinylacetate content of 28 to 49% by weight.

The composition of the present invention has 50 to 80 parts by weight of the ethylene-vinylacetate copolymer having a vinylacetate content of 50 to 80% by weight. It is because the composition has not only a deteriorated durability against gasoline and saline, but also has problem that the cable swells after it is precipitated onto oils and shows no synergic effect on the flame retardant if the ethylene-vinylacetate copolymer is less than 50 parts by weight. Also, if the ethylene-vinylacetate copolymer exceeds 80 parts by weight, it shows a problem of being easily deformed due to a reduced tensile strength and a deteriorated resistance against dynamic pressure at a high temperature of 90° C. or above. In addition, the composition shows a problem of being easily brittled by external impact due to a greatly deteriorated thermal resistance at 180° C. or more and a poor cold resistance at a low temperature.

Also, the base resin of the present invention includes 20 to 50 parts by weight of the ethylene-vinylacetate copolymer having a vinylacetate content of 28 to 49% by weight. It is because the composition has no effects of improving the cold resistance and tensile strength and reducing deformation by a dynamic pressure at a high temperature if the ethylene-vinylacetate copolymer is less than 20 parts by weight. Also, if the ethylene-vinylacetate copolymer exceeds 50 parts by weight, it has problems of showing a deteriorated durability against gasoline and saline and a severe deformation of the cable and the materials, and also has no effects of improving the improved flame retardance and forming solidified char during its combustion.

Additionally, the base resin of the composition for a cable-covering material according to the present invention has a vinylacetate content of 28 to 46% by weight, and preferably further includes 1 to 15 parts by weight of the ethylene-vinylacetate copolymer or the ethylene-vinylacetate-acid terpolymer grafted with a polar group. If the resin grafted with such a polar group is additionally incorporated into the composition as described above, the composition may have improved properties at low temperature, and improved adhesion between the compositions, thereby improving thermal resistance at high temperature. At this time, the composition may not have effects of improved tensile strength and reduced deformation due to the low resistance against dynamic pressure at high temperature if the resin grafted with the polar group is used at an amount of less than 1 part by weight in the composition, while if the resin including the polar group is added at an amount of at least 15 part by weight, its elongation may be reduced in dose-dependant manner as a strengthening effect increases, and the composition may have the increased viscosity as it is melted, resulting in a poor extruding process.

The composition according to the present intention includes a halogen-free flame retardant, including 60 to 250 parts by weight of at least two mixed metal hydroxide composed of 30 to 100 parts by weight of untreated metal hydroxide and 30 to 150 parts by weight of metal hydroxide surface-treated with silane, based on 100 parts by weight of the above-mentioned base resin. If the composition has less than 60 parts by weight of metal hydroxide, it may show deteriorated flame retardance and may not satisfy a resistance against the deformation at high temperature since the covering material has low solidity due to a low content of the inorganic materials, while, if the metal hydroxide exceeds 250 parts by weight, it may show significantly reduced properties such as extrusion processibility, elongation and cold resistance.

Here, the metal hydroxide surface-treated with silane may further improve oil resistance and thermal resistance of the composition for a covering material according to the present invention. If the composition has less than 30 parts by weight of the metal hydroxide surface-treated with silane, it may not show improved properties such as tensile strength, thermal resistance, durability against gasoline, saline and so on. In addition, the toxicity index according to NES 713 and NF X 70-100, and low smoke property according to NES 711 and NF F 16-101 may not be satisfied in composition of the present invention. While, if the metal hydroxide surface-treated with silane exceeds 150 parts by weight, it may show deteriorated properties such as elongation and extrusion processibility, and a rather low synergic effect of flame retardance due to the large quantity of surface-treated flame retardant.

The untreated metal hydroxide and the metal hydroxide surface-treated with silane, which may compose the mixed metal hydroxide included in the composition of the present invention, may preferably be selected from different kinds of metal hydroxide. For example, aluminum hydroxide surface-treated with silane and untreated magnesium hydroxide may be used as a mixture, or magnesium hydroxide surface-treated with silane and untreated aluminum hydroxide may be also used as a mixture, but is not limited thereto.

Such metal hydroxide is not limited if it may be used as a cable-covering material, and for example the metal hydroxide selected from the group consisting of aluminum hydroxide, magnesium hydroxide, calcium hydroxide, basic magnesium carbonate, hydrotalcite, huntite, hydromagnesite may be used alone or with a mixture thereof, but they are not limited thereto.

In addition, the composition of the present invention includes 1 to 30 parts by weight of a flame-retardance auxiliary, based on 100 parts by weight of the base resin. Such a flame-retardance auxiliary may be further added to satisfy the low smoke and toxicity index. If the flame-retardance auxiliary is less than 1 part by weight, it may not show an effect of inhibiting smoke and toxic gases upon its combustion, while, if the flame-retardance auxiliary exceeds 30 part by weight, it may show a rather low synergic effect of the flame retardance, and also reduced physical properties such as elongation and thermal resistance due to the increased amount of the flame-retardance auxiliary. For example, the flame-retardance auxiliary selected from the group consisting of boron compound, silicon-based compound, molybdenum-based antiflaming agent may be preferably used alone or with a mixture thereof, but is not limited thereto.

The composition of the present invention includes 0.5 to 10 parts by weight of a silane-based coupling agent, based on 100 parts by weight of the base resin. It is because the composition shows slightly improved properties such as tensile strength and thermal resistance if the coupling agent is less than 0.5 parts by weight, while the composition has reduced properties such as elongation and flame retardance if the coupling agent exceeds 10 parts by weight. The preferred silane-based coupling agent includes vinyltrimethoxyethoxysilane, oligomer-type vinyltrimethoxysilane, vinyltriethoxysilane and so on. And the coupling agent may be used alone or with a mixture thereof, but is not limited thereto.

The composition of the present invention has 3 to 15 parts by weight of a cross-linking agent, based on 100 parts by weight of the base resin. It is because the composition does not satisfy properties such as tensile strength, gasoline resistance and thermal resistance and also has a problem of being easily deformed by the pressure at high temperature if the cross-linking agent is less than 3 parts by weight, while the composition shows a reduced property such as elongation if the cross-linking agent exceeds 15 parts by weight. An example of the preferred cross-linking agent includes, but is not limited to, 1,1-bis(tert-butylperoxy)-3,3,5-trimethylcyclohexane, di-(2,4-dichlorobenzoyl)-peroxide, dibenzoyl peroxide, tert-butyl peroxybenzoate, 1,1-di-(tert-butylperoxy)-3,3,5-trimethylcyclohexane, dicumyl peroxide, di-(2-tert-buty-peroxyisopropyl)-benzene, tert-butylcumylperoxide, 2,5-Dimethyl-2,5-di-(tert-butylperoxy)-hexane, di-tert-butylperoxide, 2,5-dimethyl-2,5-di(tert-butylperoxy)hexyme-3, etc. And they may be used alone or a mixture thereof.

The composition of the present invention includes 0.5 to 8 parts by weight of a cross-linking formulation, based on 100 parts by weight of the base resin. It is because the composition shows deteriorated properties such as oil resistance, tensile strength and flame resistance if the cross-linking formulation is less than 0.5 parts by weight, while the composition has an extremely reduced property such as elongation if the cross-linking formulation exceeds 8 parts by weight. An example of the preferred cross-linking formulation includes, but is not limited to, triaryl cyanurate, triaryl isocyanurate, etc. And they may be used alone or a mixture thereof.

Meanwhile, the composition of the present invention may further include a clay having a size of nanoparticle, for example a nanoclay. The nanoclay may be comprised at an amount of 1 to 30 parts by weight in the composition of the present invention, based on 100 parts by weight of the base resin to improve oil resistance, thermal resistance, and solidification of char during its combustion. It is because the composition has effects of reducing inherent permeability of the clay on gas and oil, and increasing solidification of the char slightly if the nanoclay is less than 1 part by weight, while the composition may show a rather low effect on the flame retardance if the nanoclay exceeds 30 parts by weight.

Additionally, the composition of the present invention may further include, but is not limited to, additives such as an antioxidant, a processing aid, an UV stabilizer, etc. without departing a scope of the present invention.

Such the composition for a covering material may be used to form a coating layer of the various electric wire and cable, and, for example may be applied to the coating layer such as the insulator and the sheath layer of the cable for railway vehicles, as shown in FIG. 1. That is to say, the cable 10 for railway vehicles generally includes a conducting part 1; a separating film 3 surrounding the conducting part 1; an insulating layer 5 surrounding the separating film 3; and a sheath layer 7 surrounding the insulating layer 5, as shown in FIG. 1, but the cable for railway vehicles according to the present invention may not be applied to the composition for a covering material previously described for at least one of the insulating layer 5 and the sheath layer 7, respectively.

Here, the conducting part 1 may be composed of an assembly of a conductor twisted in a spiral pattern, or a combination of the assembled unit conductors. In addition, the conducting part 1 was covered with the separating film 3, which includes a polyester tape, a drawing paper, or a nonwoven fabric, etc.

Hereinafter, the present invention will be described in detail with specific example. However, it should be understood that the detailed description and specific examples according to preferred embodiments of the invention, are given by way of illustration only, since various changes and modifications within the spirit and scope of the invention will become apparent to those skilled in the art from this detailed description.

The compositional components of the cable-covering materials were prepared according to the component and the ratio of the following Tables 1 and 2, kneaded in an open roll, and then molded at 170° C. for 20 minutes using a press to obtain test pieces. In addition, the cables including the sheath layer formed using each of the compositions were prepared, as shown in FIG. 1, and then a flame retardant test was carried out according to IEC 332-3 cat.A, smoke index according to IEC 601034 and NF F 16-101, and toxicity index according to NF F 70-100, respectively. In addition, the resultant cable was immersed in gasoline, and then change level in the outer diameter was measured.

Referring to the Table 1, the ethylene-vinylacetate copolymers having different contents of vinylacetate were mixed as the base resin in the Embodiments 1 to 6. In particular, the composition of the Embodiments 2, 3, 5 and 6 further included the ethylene-vinylacetate copolymer or the ethylene-vinylacetate-acid terpolymer grafted with a maleic anhydride, and then their characteristics were measured.

Referring to the Table 2, the ethylene-vinylacetate copolymer having 28% by weight of polyvinyl chloride, chlorinated polyethylene, polypropylene, polyethylene terephthalate, or vinylacetate was solely used as the base resin in the Comparative embodiments 1 to 5, unlike the Embodiments 1-6 of Table 1.

Contents are represented by part(s) by weight in the Tables 1 and 2.

TABLE 1

|  | Embodiments | | | | | |
|---|---|---|---|---|---|---|
|  | 1 | 2 | 3 | 4 | 5 | 6 |
| Ethylene-vinylacetate copolymer (vinylacetate conent of 70 wt %) | 70 | 70 | 70 | 80 | 80 | 80 |
| Ethylene-vinylacetate copolymer (vinylacetate conent of 40 wt %) | 30 | 20 | 20 |  |  |  |
| Ethylene-vinylacetate copolymer (vinylacetate conent of 28 wt %) |  |  |  | 20 | 10 | 10 |
| Ethylene-vinylacetate copolymer grafted with a maleic anhydride (vinylacetate conent of 33 wt %) |  | 10 |  |  | 10 |  |
| Ethylene-vinylacetate copolymer grafted with a maleic anhydride (vinylacetate conent of 28 wt %) |  |  | 10 |  |  | 10 |

TABLE 1-continued

| | Embodiments | | | | | |
|---|---|---|---|---|---|---|
| | 1 | 2 | 3 | 4 | 5 | 6 |
| Antioxidant | 3 | 3 | 3 | 3 | 3 | 3 |
| Magnesium hydroxide (untreated) | | | | 50 | 50 | 50 |
| Magnesium hydroxide (surface-treated with silane) | 90 | 100 | 100 | | | |
| Aluminum hydroxide (untreated) | 60 | 50 | 50 | | | |
| Aluminum hydroxide (surface-treated with silane) | | | | 90 | 100 | 100 |
| Nanoclay | 10 | | | 10 | | |
| Boron compound | 15 | 15 | 15 | 15 | 15 | 15 |
| Silane | 2 | 2 | 2 | 2 | 2 | 2 |
| Cross-linking formulation | 3 | 3 | 3 | 3 | 3 | 3 |
| Cross-linking agent | 9 | 9 | 9 | 9 | 9 | 9 |

In the Table 1, LEVAPREN 700HV was commercially available from the company Bayer as the ethylene-vinylacetate copolymer having a vinylacetate content of 70% by weight. EVAFLEX 40LX was commercially available from the company Dupont-Mitsui as the ethylene-vinylacetate copolymer having a vinylacetate content of 40% by weight. EVAFLEX V421 was commercially available from the company Dupont-Mitsui as the ethylene vinylacetate polymer having a vinylacetate content of 28% by weight. The ethylene-vinylacetate copolymer and the ethylene-vinylacetate-acid terpolymer grafted with the polar group, were used, the terpolymer obtained by grafting 0.2 to 5% by weight of a maleic anhydride into ethylene vinylacetate having a vinylacetate content of 33% by weight and ethylene vinylacetate having a vinylacetate content of 28% by weight. IRGANOX 1010 was commercially available from the company Giba-Geigy as the antioxidant. Magnifin H5 was commercially available from the company Albermarle as the untreated magnesium hydroxide. KISUMA 5P was commercially available from the company Kyowa as the magnesium hydroxide surface-treated with silane. MARTINAL OL104LE was commercially available from the company Albermarle as the untreated aluminum hydroxide. MARTINAL OL104S was commercially available from the company Albermarle as the aluminum hydroxide surface-treated with silane. The widely known nanoclay was commercially available. ZB2335 from the company Borax was used as the boron compound. A-172 was commercially available from the company UCC as the silane. PERKADOX 14/40 PD was commercially available from the company NOF as the cross-linking agent. And TAIC M70 was commercially available from the company LG Chemicals as the cross-linking formulation.

TABLE 2

| | Comparative embodiment | | | | |
|---|---|---|---|---|---|
| | 1 | 2 | 3 | 4 | 5 |
| Polyvinylchloride | 100 | | | | |
| Chlorinated polyethylene | | 100 | | | |
| Polypropylene | | | 100 | | |
| Polyethylene terephthalate | | | | 100 | |
| Ethylene-vinylacetate copolymer (vinylacetate conent of 28 wt %) | | | | | 100 |
| Antioxidant | | | 2 | 2 | 3 |
| Lead-based stabilizer | 6 | 6 | | | |
| Tri-2-ethylhexyl trimellitate | 55 | | | | |
| Calcium carbonate | 40 | 40 | | | |
| Antimony trioxide | 20 | 20 | | | |
| Magnesium hydroxide | 20 | 50 | 80 | 80 | 150 |
| Aluminum hydroxide | 30 | | | | |
| Cross-linking formulation | | | 3 | | 3 |
| Cross-linking agent | | | 3 | | 6 |

In the Table 2, PVC LS130 was commercially available from the company LG Chemicals as the polyvinylchloride. CPE 401A was commercially available from the company Showa as the chlorinated polyethylene. BB 125MO was commercially available from the company Borealis as the polypropylene. EVAFLEX V421 was commercially available from the company Dupont-Mitsui as the ethylene-vinylacetate copolymer having a vinylacetate content of 28% by weight. IRGANOX 1010 was commercially available from the company Ciba-Geigy as the antioxidant. TLS was commercially available from the company Songwon as the lead-based stabilizer. TOTM was commercially available from the company LG Chemical as tri-2-ethylhexyl trimellitate. OMYA 1T was commercially available from the company OMYA Korea Inc. as calcium carbonate. Magnifin H5 was commercially available from the company Albermarle as magnesium hydroxide. MARTINAL OL 104LE was commercially available from the company Albermarle as aluminum hydroxide. TAIC M70 was commercially available from the company LG Chemical as the cross-linking formulation. PERKADOX 14/40 PD was commercially available from the company NOF as the cross-linking agent. In addition, the widely known polyethylene terephthalate and antimony trioxide were commercially available.

For the test pieces and the cable prepared previously, various physical properties such as property at break, thermal resistance, oil resistance, CSA cold resistance, Oxygen index, halogen content and flame retardance were measured and their evaluations were carried out as follows.

1) Property at break: The tensile strength and the elongation were measured at 250 mm/min of a tension speed according to the IEC 60811-1-1.

2) Thermal resistance: Test pieces was kept at 180° C. for 168 hours, and then the residual tensile strength and the residual elongation were measured according to the IEC 60811-1-1.

3) Oil resistance: A test was carried out according to the BS 2G 230 test 29. Samples was taken in a size of about 600 mm, and bent in a U shape by 10 times of a magnetic diameter. The samples were immersed in gasoline at 70° C. for 168 hours and taken out, and then the change level in the outer diameter, the residual tensile strength and the residual elongation were measured.

4) Dynamic cut-through test: A test was carried out at 90° C. according to NFC 93-522 by pressing the test pieces under 6 kg/min using a blade having a diameter of 0.125 mm.

5) Saline resistance: The test pieces were immersed in gasoline at 35° C. for 500 hours and then the residual tensile strength was measured according to IEC 68-2. It should be 85% or more.

6) Smoke density: a finished cable was tested according to IEC 61034. It should satisfy at least 80% of permeability.

7) Smoke index: A test was carried out according to NF F 16-101. And smoke index should be 5 or less.

8) Toxicity index: A test was carried out according to NF X 70-100. And toxicity index should be 1 or less.

9) Flame retardance: A test was carried out according to a flame retardant test standard of IEC 332-3 cat.A. The cable was subject to 70,000 Btu/hr of heat capacity for 40 minutes, and then its flamed length should be measured to be 2.44 m or less.

Each of physical properties of the test piece and the cable were measured and listed in Tables 3 and 4, as follows.

TABLE 3

|  |  | Embodiment | | | | | |
| --- | --- | --- | --- | --- | --- | --- | --- |
|  |  | 1 | 2 | 3 | 4 | 5 | 6 |
| Physical property at break | Tensile strength (kgf/mm$^2$) | 1.05 | 1.07 | 1.05 | 1.1 | 1.1 | 1.17 |
|  | Elongation (%) | 261 | 223 | 232 | 178 | 178 | 171 |
| Thermal resistance | Residual tensile strength (%) | 97 | 98 | 98 | 97 | 103 | 99 |
|  | Residual elongation (%) | 83 | 77 | 79 | 83 | 67 | 72 |
| Oil resistance | Residual tensile strength (%) | 87 | 91 | 89 | 87 | 86 | 90 |
|  | Residual elongation (%) | 89 | 87 | 90 | 89 | 82 | 84 |
|  | Change level in outer diameter (%) | 2.5 | 5 | 5.3 | 2 | 5 | 4 |
| Saline resistance | Residual tensile strength (%) | 99 | 101 | 97 | 99 | 97 | 96 |
|  | Dynamic cut-through test | Passed | Passed | Passed | Passed | Passed | Passed |
|  | Smoke density (%) | 94 | 95 | 95 | 94 | 93 | 94 |
|  | Smoke index | 3.0 | 4.1 | 3.9 | 3.0 | 3.2 | 3.1 |
|  | Toxicity index | 0.73 | 0.85 | 0.89 | 0.73 | 0.8 | 0.82 |
|  | Flame retardance (M) | 1.0 | 1.2 | 1.2 | 1.1 | 1.4. | 1.4 |

TABLE 4

|  |  | Comparative embodiment | | | | |
| --- | --- | --- | --- | --- | --- | --- |
|  |  | 1 | 2 | 3 | 4 | 5 |
| Physical property at break | Tensile strength (kgf/mm$^2$) | 1.5 | 1.0 | 1.8 | 2.4 | 1.2 |
|  | Elongation (%) | 230 | 240 | 270 | 170 | 205 |
| Thermal resistance | Residual tensile strength (%) | 10 | 15 | 101 | 103 | 85 |
|  | Residual elongation (%) | 5 | 11 | 43 | 78 | 34 |
| Oil resistance | Residual tensile strength (%) | 90 | 86 | 96 | 99 | 78 |
|  | Residual elongation (%) | 26 | 23 | 84 | 91 | 23 |
|  | Change in outer diameter (%) | 68 | 47 | 13 | 8 | 80 |
| Saline resistance | Residual tensile strength (%) | 97 | 93 | 94 | 98 | 76 |
|  | Dynamic cut-through test | Passed | Passed | Passed | Passed | Failed |
|  | Smoke density (%) | 15 | 23 | 85 | 84 | 82 |
|  | Smoke index | 25 | 21 | 6.1 | 4.5 | 8 |
|  | Toxicity index | 5 | 4.7 | 1.1 | 0.9 | 1.5 |
|  | Flame retardance (M) | 1.0 | 1.1 | 2.5 | 1.8 | 1.3 |

Referring to the Tables 3 and 4, it is revealed that the halogen-free flame retardant composition for a cable-covering material according to the present invention shows good mechanical properties at room temperature, as well as excellent durabilities such thermal resistance, oil resistance and saline resistance, compared to the Comparative embodiments, when it includes the ethylene-vinylacetate copolymer having a different content of vinylacetate as a base resin, and a suitable amount of the mixture of untreated metal hydroxide and metal hydroxide surface-treated with silane as a flame retardant. Also, that the composition according to the present invention shows excellent resistance against dynamic pressure at high temperature, as well as excellent stabilities such as low smoke, low toxicity and flame retardance upon the firing.

INDUSTRIAL APPLICABILITY

As described above, the composition for a cable-covering material according to the present invention shows excellent properties such as resistance against dynamic pressure at high temperature and durability against saline, water, gasoline etc., as well as low smoke and flame retardance upon its combustion. Accordingly, the composition for a cable-covering material according to the present invention may be useful as the cable for railway vehicles under the extreme conditions.

What is claimed is:

1. A halogen-free flame retardant composition for a cable-covering material used to form a coating layer of cable for railway vehicles, comprising:

100 parts by weight of a base resin including 50 to 80 parts by weight of an ethylene-vinylacetate copolymer having a vinylacetate content of 50 to 80% by weight, and 20 to 50 parts by weight of an ethylene-vinylacetate copolymer having a vinylacetate content of 28 to 49% by weight;

60 to 250 parts by weight of mixed metal hydroxide acting as a halogen-free flame retardant and composed of 30 to 100 parts by weight of untreated metal hydroxide and 30 to 150 parts by weight of metal hydroxide surface-treated with silane;

1 to 30 parts by weight of a flame-retardance auxiliary;

0.5 to 5 parts by weight of a silane-based coupling agent;

0.5 to 8 parts by weight of a cross-linking formulation; and 3 to 15 parts by weight of a cross-linking agent.

2. The halogen-free flame retardant composition for a cable-covering material according to claim 1, wherein the base resin further has 1 to 15 parts by weight of an ethylene-vinylacetate copolymer, with a vinylacetate content of 28 to 46% by weight or an ethylene-vinylacetate-acid terpolymer grafted with a polar group.

3. The halogen-free flame retardant composition for a cable-covering material according to claim 2,
wherein the polar group is selected from the group consisting of a maleic anhydride, glycidyl methacrylate and acrylic acid.

4. The halogen-free flame retardant composition for a cable-covering material according to claim 2,
wherein the metal hydroxide is selected from the group consisting of aluminum hydroxide, magnesium hydroxide, calcium hydroxide, basic magnesium carbonate, hydrotalcite, huntite and hydromagnesite.

5. The halogen-free flame retardant composition for a cable-covering material according to claim 2,
wherein the mixed metal hydroxide is a mixture of untreated aluminum hydroxide and magnesium hydroxide surface-treated with silane, or a mixture of untreated magnesium hydroxide and aluminum hydroxide surface-treated with silane.

6. The halogen-free flame retardant composition for a cable-covering material according to claim 2,
wherein the flame-retardance auxiliary is selected from the group consisting of borate, boron compound, silicon-based compound, molybdenum-based compound and tin-based compound.

7. The halogen-free flame retardant composition for a cable-covering material as defined in claim 2, further comprising 1 to 30 parts by weight of nanoclay.

8. The halogen-free flame retardant composition for a cable-covering material according to claim 1,
wherein the metal hydroxide is selected from the group consisting of aluminum hydroxide, magnesium hydroxide, calcium hydroxide, basic magnesium carbonate, hydrotalcite, huntite and hydromagnesite.

9. The halogen-free flame retardant composition for a cable-covering material according to claim 1,
wherein the mixed metal hydroxide is a mixture of untreated aluminum hydroxide and magnesium hydroxide surface-treated with silane, or a mixture of untreated magnesium hydroxide and aluminum hydroxide surface-treated with silane.

10. The halogen-free flame retardant composition for a cable-covering material according to claim 1,
wherein the flame-retardance auxiliary is selected from the group consisting of borate, boron compound, silicon-based compound, molybdenum-based compound and tin-based compound.

11. The halogen-free flame retardant composition for a cable-covering material as defined in claim 1, further comprising 1 to 30 parts by weight of nanoclay.

12. A cable for railway vehicles comprising a conducting part; a separating film surrounding the conducting part; an insulating layer surrounding the separating film; and a sheath layer surrounding the insulating layer;
wherein at least one of the insulating layer and the sheath layer is formed of the composition comprising:
100 parts by weight of a base resin including 50 to 80 parts by weight of an ethylene-vinylacetate copolymer having a vinylacetate content of 50 to 80% by weight, and 20 to 50 parts by weight of an ethylene-vinylacetate copolymer having a vinylacetate content of 28 to 49% by weight;
60 to 250 parts by weight of mixed metal hydroxide acting as a halogen-free flame retardant and composed of 30 to 100 parts by weight of untreated metal hydroxide and 30 to 150 parts by weight of metal hydroxide surface-treated with silane;
1 to 30 parts by weight of a flame-retardance auxiliary;
0.5 to 5 parts by weight of a silane-based coupling agent;
0.5 to 8 parts by weight of a cross-linking formulation; and
3 to 15 parts by weight of a cross-linking agent.

13. The cable for railway vehicles according to the claim 12, wherein the base resin further has 1 to 15 parts by weight of an ethylene-vinylacetate copolymer, with a vinylacetate content of 28 to 46% by weight or an ethylene-vinylacetate-acid terpolymer grafted with a polar group.

14. The cable for railway vehicles according to the claim 12,
wherein the metal hydroxide is selected from the group consisting of aluminum hydroxide, magnesium hydroxide, calcium hydroxide, basic magnesium carbonate, hydrotalcite, huntite and hydromagnesite.

15. The cable for railway vehicles according to the claim 12,
wherein the mixed metal hydroxide is a mixture of untreated aluminum hydroxide and magnesium hydroxide surface-treated with silane, or a mixture of untreated magnesium hydroxide and aluminum hydroxide surface-treated with silane.

16. The cable for railway vehicles according to the claim 12,
wherein the flame-retardance auxiliary is selected from the group consisting of borate, boron compound, silicon-based compound, molybdenum-based compound and tin-based compound.

* * * * *